April 9, 1946. E. CRONHOLM 2,398,133
ELECTRICALLY DRIVEN FILM FEEDING MECHANISM
FOR PHOTOGRAPHIC APPARATUS
Filed April 13, 1944 3 Sheets-Sheet 1

INVENTOR.
Einar Cronholm
BY
ATTORNEY.

INVENTOR.
Einar Cronholm
BY William C Linton
ATTORNEY.

Patented Apr. 9, 1946

2,398,133

UNITED STATES PATENT OFFICE 2,398,133

ELECTRICALLY DRIVEN FILM FEEDING MECHANISM FOR PHOTOGRAPHIC APPARATUS

Einar Cronholm, Goteborg, Sweden

Application April 13, 1944, Serial No. 530,887
In Sweden May 8, 1942

4 Claims. (Cl. 242—71)

In a photographic apparatus for single exposures wherein the roll film feeding mechanism is driven by an electric motor it is important that the rotating element from which the movement for feeding the film is taken is brought to stop exactly after each completed revolution. For this purpose it has been proposed to transmit the movement from the motor by means of a disengaging coupling whereby means are provided for disengaging the driven element of the coupling after a completed revolution of said element.

The main object of this invention is to provide a film feeding mechanism of the kind referred to which operates satisfactorily even under disadvantageous conditions, for instance at the low temperatures to which cameras for photographing from aircraft (aerial cameras) are exposed.

Figure 1:
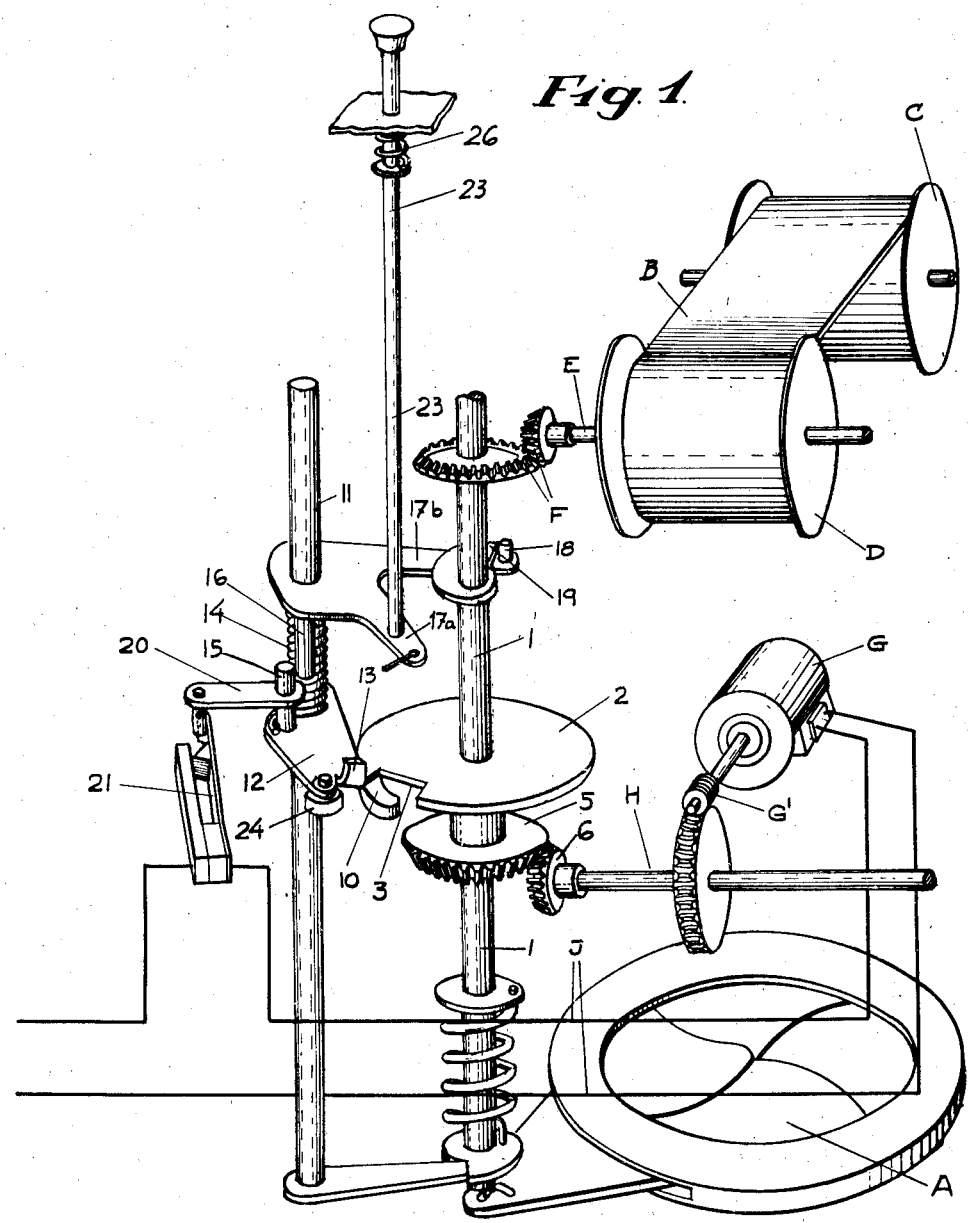
Figure 2:
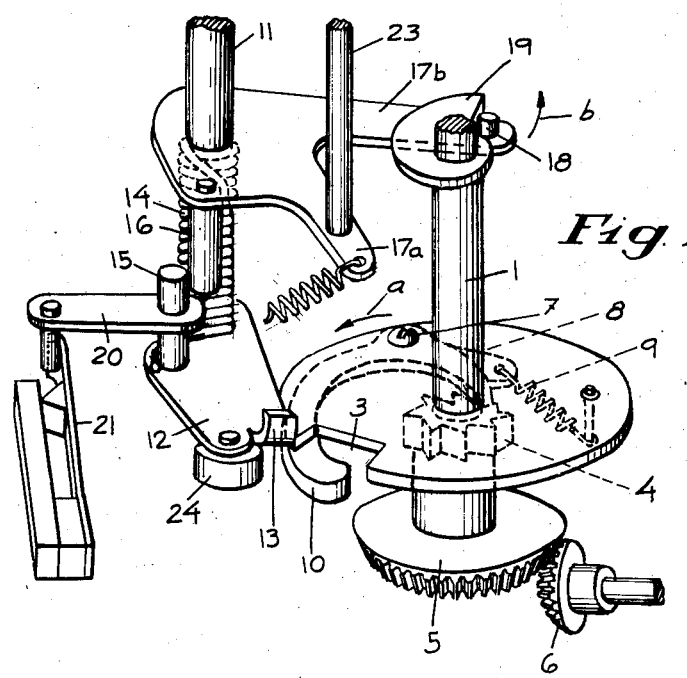
Figure 5:
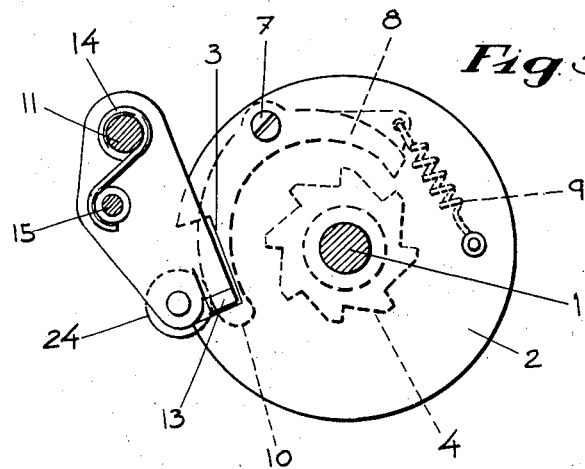
Figure 3:
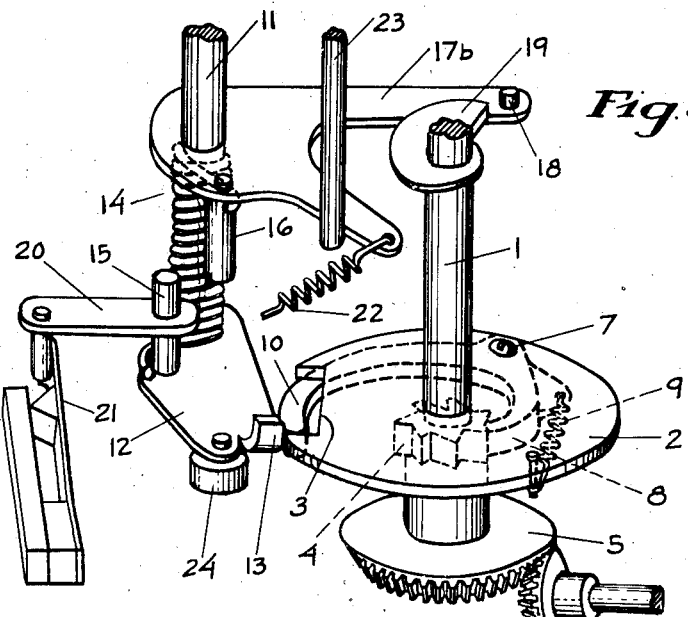
Figure 4:
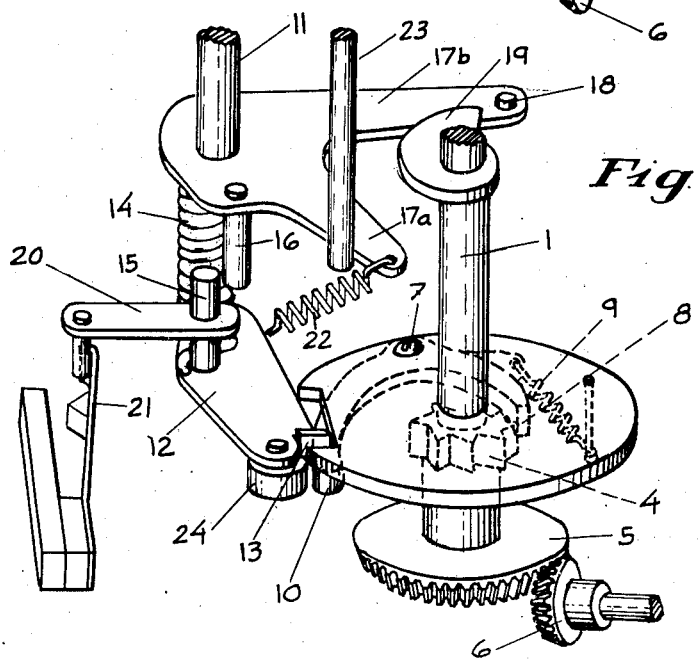

An embodiment of the invention is shown in the accompanying drawings, wherein:

Figure 1 is a diagrammatical view of the principal parts of a taking camera provided with a film feeding mechanism according to the invention, Figures 2–4 show the film feeding mechanism in different operating positions, and Figure 5 is a plan view of the disengaging coupling.

In Figure 1, in which the casing of the taking camera and the bearings for the several shafts and axis are removed, A denotes the shutter and B the film which is wound off from the spool C to the take-up spool D fixed to the rotatably mounted shaft E. This shaft E by means of a bevel gear system F is driven by a rotatably mounted shaft I. G indicates an electrical motor which by means of a worm gear $G^1$ rotates a rotatably mounted shaft H provided at one end with a bevel gear wheel 6. To the shaft I there is fastened a circular disc 2 in the periphery of which there is provided a recess 3. On the shaft I adjacent to the disc 2 there is rotatably mounted a ratchet 4 which by means of a sleeve connected to a bevel gear wheel 5 meshing with the aforesaid bevel gear wheel 6 is caused to rotate therewith. At the same side of the disc 2 as the ratchet 4 there is provided a pawl 8 swingably mounted on a journal 7 fixed to the disc, said pawl being actuated by a spring 9 which aims to swing the pawl into engagement with the ratchet 4. The pawl is provided with a curved tail portion 10 which extends to the recess 3. On a rotatably mounted shaft 11 parallel to the shaft I there is swingably mounted a radially projecting arm 12 which at its free end is provided with a nose 13. The arm 12 is actuated by a cylindrical spiral spring 14 surrounding the shaft 11 the one end of said spring being fastened to a pin 15 projecting from the arm 12 and parallel to the shaft 11. The other end of the spring 14 is fastened to a pin 16 projecting towards the arm 12 from a double arm fixed to and radially projecting from the shaft 11, the one branch of said double arm being indicated by 17a and the other branch by 17b. The pins 15, 16 limit by abutting against each other the swinging movement caused by the spring 14 of the arm 12 and the double arm 17a, 17b in relation to each other. The free end of the branch 17b carries an abutment 18 adapted to co-operate with a cam 19 fixed to the shaft I. On the pin 15 there is swingably mounted an arm 20 adapted to operate a switch 21 in the electric lines I to the motor G. 23 indicates a slidably mounted releasing member adapted to co-operate with the branch 17a which is actuated by a spring 22. At the free end of the arm 12 there is provided a roller 24 adapted to actuate the tail portion 10 of the pawl 8.

The device described operates in the following manner:

In the initial position shown in Figure 4 and in which the arm 12 and the double arm 17a, 17b are kept by the releasing member 23 against the action of the spring 22, the nose 13 of the arm 12 finds itself in the recess 3 and the roller 24 keeps by acting upon the tail portion 10 the pawl 8 out of engagement with the ratchet 4. In this position of the arm 12 the switch 21 is kept in off position by the link 20. As the releasing member 23 is drawn up out of engagement with the branch 17a the spring 22 swings the branches 17a and 17b and also the arm 12 to the position shown in Figure 2, whereby the nose 13 of the arm 12 is brought out of engagement with the recess 3, the roller 24 is brought away from the tail portion 10, so that the pawl 8 by the spring 9 may be brought into engagement with the ratchet 4, and the abutment 18 carried by the branch 17b is brought within the path of movement of the cam 19. At the same time the link 20 brings the switch to closed position so that the motor G starts, whereby the shaft I is caused to rotate in the direction indicated by the arrow $a$ in Figure 2. During the revolution of the shaft I the cam 19 swings the branch 17b in the direction indicated by the arrow $b$ in Figure 2, whereby the spring 14 is keeping the arm 12 against the disc 2 along the periphery of which the nose 13 of the arm 12 is sliding with a pressure depending on the tension of the spring 14. Before the highest point of the cam 19 leaves the abutment 18 of the branch 17 the other branch 17a has been swung away from the path of movement of the releasing member 23 so that this may by a spring 26 be brought back to its arresting position shown in Figure 3. As the recess 3 during the revolution of the disc 2 reaches the nose 13 sliding along the periphery of the disc 2 the arm 12 is permitted to be swung by the spring 14 towards the centre of the disc back to its initial position in the recess 3 (see Figure 4), whereby the roller 24 carried by the arm 12 abuts with great force against the tail portion 10 so that the pawl 8 is swung out of engagement with the ratchet 4. The shaft which has now completed a revolution is thus stopped, and during this revolution of the shaft 1 the exposed portion of the film B has been wound up on the spool D driven by the shaft 1. At the last mentioned swinging movement of the arm 12 the switch 21 is by means of the link 20 brought back to open position, whereby the motor G will cease to rotate. The several parts of the feeding mechanism are now ready for a further release by means of the releasing member 23, whereby the operation described will be repeated.

I claim:

1. An improvement in roll film feeding mechanisms for cameras for taking single exposures comprising a motor driven toothed wheel, a disc having a recess formed in the periphery thereof, a pawl pivotally mounted on said disc and adapted to engage said toothed wheel, a member pivotally mounted adjacent the periphery of said disc, a spring connected to said member for retaining the same against the periphery of said disc, an end portion of said pawl being positioned for receiving movement from said pivotal member when abutting said disc recess and means for operatively connecting said disc to the film take up spool.

2. An improvement in roll film feeding mechanisms for cameras for taking single exposures comprising a motor driven toothed wheel, a disc having a recess formed in the periphery thereof, a pawl pivotally mounted on said disc and adapted to engage said toothed wheel, a member pivotally mounted adjacent the periphery of said disc, a spring connected to said member for retaining the same against the periphery of said disc, an end portion of said pawl being positioned for receiving movement from said pivotal member when abutting said disc recess, means for operatively connecting said disc to the film take up spool, a cam connected to said disc and said spring for increasing the tension of said spring on movement of said disc.

3. An improvement in roll film feeding mechanisms for cameras for taking single exposures comprising an electric motor driven toothed wheel, a disc having a recess formed in the periphery thereof, a pawl pivotally mounted on said disc and adapted to engage said toothed wheel, a shaft, a member pivotally mounted on said shaft adjacent the periphery of said disc, an arm projecting from said shaft, a cam connected to said disc and contacting said arm, a spring connecting said arm and said pivotal member and adapted to retain said member against the periphery of said disc, an end portion of said pawl being positioned for receiving movement from said pivotal member when abutting said disc recess and means for operatively connecting said disc to the film take up spool.

4. An improvement in roll film feeding mechanisms for cameras for taking single exposures comprising an electric motor driven toothed wheel, a disc having a recess formed in the periphery thereof, a pawl pivotally mounted on said disc and adapted to engage said toothed wheel, a shaft, a member pivotally mounted on said shaft adjacent the periphery of said disc, a switch connected in the current supply lines of the aforementioned electric motor, means operatively connecting said pivotal member to said switch for opening said switch when said member abuts said disc recess, an arm projecting from said shaft, a cam connected to said disc and contacting said arm, a spring connecting said arm and said pivotal member and adapted to retain said member against the periphery of said disc, an end portion of said pawl being positioned for receiving movement from said pivotal member when abutting said disc recess and means for operatively connecting said disc to the film take up spool.

EINAR CRONHOLM.